United States Patent
Luh

(10) Patent No.: US 6,631,319 B1
(45) Date of Patent: Oct. 7, 2003

(54) METHOD AND DEVICE FOR CONTROLLING THE DRIVE UNIT OF A VEHICLE

(75) Inventor: Joachim Luh, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/018,872

(22) PCT Filed: Apr. 27, 2000

(86) PCT No.: PCT/DE00/01320

§ 371 (c)(1),
(2), (4) Date: Jan. 17, 2002

(87) PCT Pub. No.: WO00/79111

PCT Pub. Date: Dec. 28, 2000

(30) Foreign Application Priority Data

Jun. 22, 1999 (DE) .......................................... 199 28 516

(51) Int. Cl.⁷ ............................. B60K 41/08; G06F 7/00
(52) U.S. Cl. ......................................... 701/54; 180/170
(58) Field of Search ............................. 701/54, 51, 79, 701/70, 110; 180/170

(56) References Cited

U.S. PATENT DOCUMENTS

| | | | | |
|---|---|---|---|---|
| 5,113,185 A | * | 5/1992 | Ichikawa | .................... 340/990 |
| 5,151,862 A | * | 9/1992 | Nakayama et al. | ............ 33/356 |
| 5,189,430 A | * | 2/1993 | Yano et al. | .................. 340/995 |
| 5,209,203 A | | 5/1993 | Kaltenbrunn et al. | |
| 5,251,139 A | * | 10/1993 | Takano et al. | .................. 33/356 |
| 6,032,098 A | * | 2/2000 | Takahashi et al. | ........... 701/210 |
| 6,041,280 A | * | 3/2000 | Kohli et al. | ........... 342/357.08 |
| 6,169,516 B1 | * | 1/2001 | Watanabe et al. | ........... 340/995 |
| 6,169,552 B1 | * | 1/2001 | Endo et al. | .................. 345/419 |
| 6,222,485 B1 | * | 4/2001 | Walters et al. | .............. 340/995 |
| 6,236,937 B1 | * | 5/2001 | Kohli | .......................... 342/355 |
| 6,246,932 B1 | * | 6/2001 | Kageyama et al. | ......... 340/992 |
| 6,292,749 B2 | * | 9/2001 | Kohli | .......................... 342/355 |

FOREIGN PATENT DOCUMENTS

| | | |
|---|---|---|
| DE | 195 23 898 | 1/1997 |
| DE | 198 28 603 | 2/1999 |
| EP | 0 655 554 | 5/1995 |

* cited by examiner

Primary Examiner—William A Cuchlinski, Jr.
Assistant Examiner—Olga Hernandez
(74) Attorney, Agent, or Firm—Walter Ottesen

(57) ABSTRACT

A method and an arrangement for controlling the drive unit of a vehicle are suggested wherein the torque of the drive unit is influenced in the sense of a reduction of vibrations in the drive train of the vehicle in dependence upon the actual rpm and a pregiven desired rpm. The desired rpm is derived on the basis of at least one engine rpm gradient which is caused by the transmission ratio shift and/or by the driver input.

6 Claims, 3 Drawing Sheets

METHOD AND DEVICE FOR CONTROLLING THE DRIVE UNIT OF A VEHICLE

FIELD OF THE INVENTION

The invention relates to a method and an arrangement for controlling the drive unit of a vehicle.

BACKGROUND OF THE INVENTION

A method and an arrangement of this kind are disclosed in DE-A 195 23 898. There, to reduce vibrations in the drive train of the vehicle, the torque of the drive unit, for example, the ignition angle thereof, is influenced in accordance with a comparison between the rpm of the drive unit and a model or desired rpm obtained based on the torque conditions in the drive train of the vehicle. The model or desired rpm is formed by integration from a torque representing the driver command. By comparing the model or desired rpm to the rpm of the drive unit, vibrations of the vehicle drive are recognized and isolated in order to be then dampened by phase-correct torque interventions. The use of this so-called anti-jolt function leads to unexpected vehicle reactions when a transmission is downshifted when depressing the accelerator pedal. The increase of the engine rpm connected therewith is interpreted as drive train vibration and leads to a reduction of the engine torque. This is perceived by the driver as being unpleasant. This problem occurs primarily in continuously variable transmissions or in transmissions having a continuous shift characteristic but can also be significant in other transmission types.

SUMMARY OF THE INVENTION

It is an object of the invention to provide measures which optimize an anti-jolt function even for downshifting operations of a transmission.

With the formation of the desired or model rpm, which is described hereinafter, it is effectively avoided that the reduction of the engine torque occurs as a consequence of the anti-jolt function when depressing the accelerator pedal while downshifting a transmission. The acceleration characteristic of the vehicle is improved.

It is especially advantageous that a deterioration of the anti-jolt function does not take place so that this function displays its usual advantages and effectively suppresses drive train vibrations.

It is especially advantageous that the desired or model rpm is formed on the basis of operating variables which are anyway available. In this way, a reduction of the complexity results with improved function.

The application of the procedure described hereinafter is especially advantageous with continuously variable transmissions. In this application, an especially advantageous effect is achieved and the driving performance of the vehicle is considerably improved when depressing the accelerator pedal.

BRIEF DESCRIPTION OF THE DRAWINGS

The invention will be explained in greater detail with reference to the embodiments shown in the drawing.

DESCRIPTION OF THE PREFERRED EMBODIMENTS OF THE INVENTION

Figure 1:
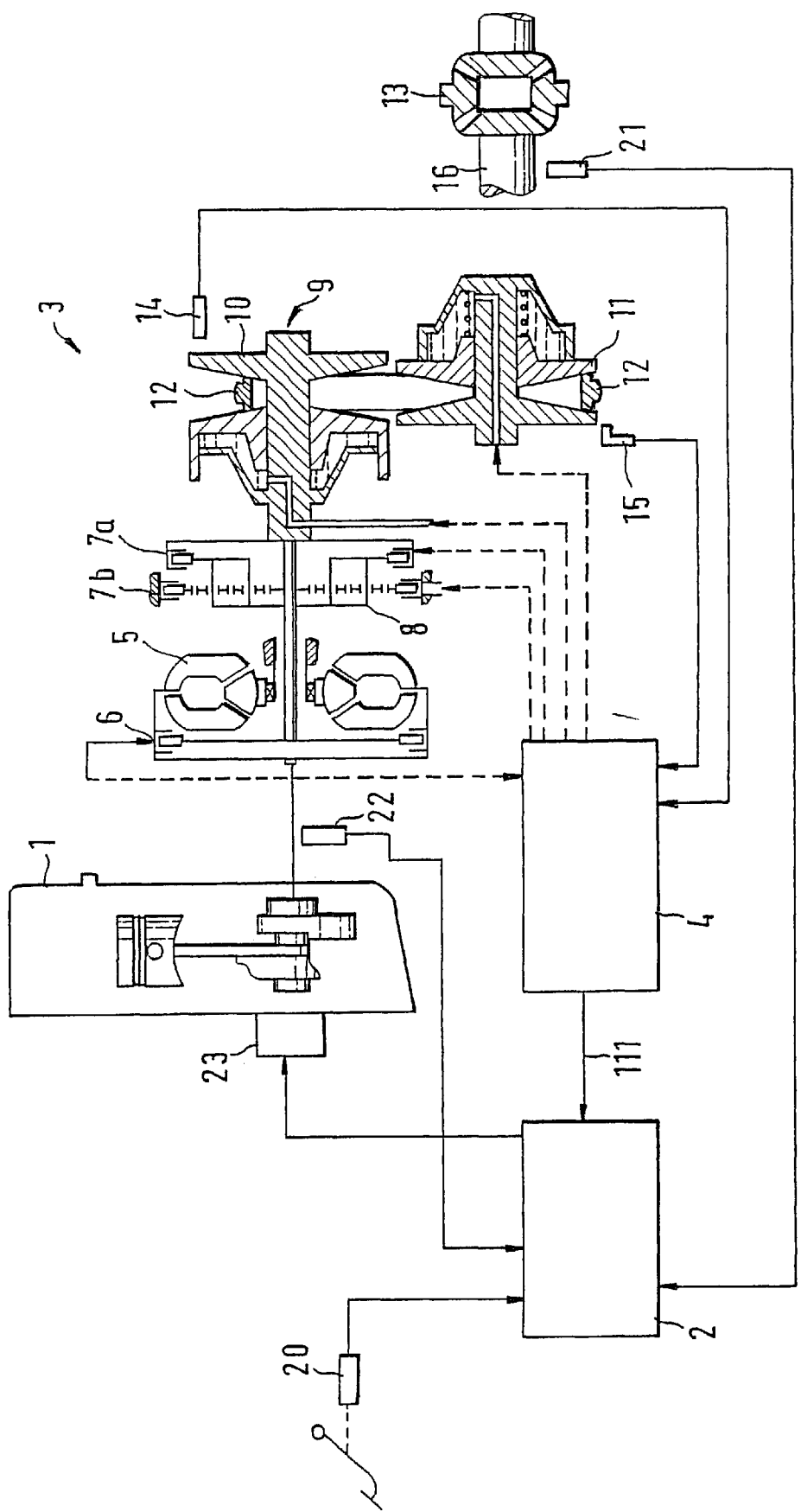
FIG. 1 shows the control of a drive unit which is equipped with a continuously variable automatic transmission. This is a preferred embodiment of the invention which is applicable, however, also in combination with other transmission types.

In FIG. 1, a preferred embodiment is shown which shows the control of a drive unit of a vehicle equipped with a continuously variable automatic transmission. An internal combustion engine 1 is shown having an electronic engine control unit 2. The continuously variable transmission 3 includes an electronic transmission control unit 4. The engine control unit and the transmission control unit are, in one embodiment, accommodated in a combined control apparatus. The continuously variable transmission 3 includes a torque converter 5 with a converter bridging clutch 6 and clutches (7a, 7b) for the forward and rearward drive switchover having a set of planetary gears 8 which are mounted between the engine 1 and the variator 9. The variator 9 includes a drive-end (primary) set of conical pulleys 10 and an output-end (secondary) set of conical pulleys 11. The force from the drive pulley set is transmitted to the output pulley set with the aid of a chain or a thrust-member belt 12. Each set of conical pulleys comprises an axially fixed and an axially movable disc. The transmission ratio of the variator 9 changes from a high start-drive transmission ratio (low) to a low transmission ratio (overdrive) because of the simultaneous variation of the axially movable discs on the drive pulley set and the output pulley set. The output pulley set 11 is connected to the drive shafts 16 of the wheels via a compensating gear unit 13. The electronic transmission control unit 4 has at least the task to adjust and detect the ratio of the transmission. For this purpose, rpm sensors 14 and 15 can be mounted, for example, on the drive disc 10 and the output disc 11. Conventionally, the electronic transmission control 4 adjusts the ratio of the transmission 3, controls the clutches (7a, 7b) and the converter bridge clutch 6. In addition to this continuous belt transmission presented as exemplary, also other transmissions can be utilized which are continuously adjustable in their transmission ratio (for example, friction wheel transmissions, torroid transmissions, et cetera).

The electronic engine control 2 is connected to sensors 20 for detecting the driver command. In the simplest case, a sensor of this kind is an accelerator pedal position sensor. Furthermore, sensors 21 for detecting the vehicle speed and sensors 22 for detecting the engine rpm are provided. The engine control 2 operates on at least one positioning element 23 for adjusting the engine torque in accordance with the desired torque pregiven on the basis of the driver command. Here, in connection with the procedure described hereinafter, it is not significant as to how this at least one actuating element is driven with the aid of which the engine desired torque is converted into an engine torque.

In addition to the use of internal combustion engines, the procedure described hereinafter is also used in combination with other drive concepts, for example, electric motors.

Figure 2:
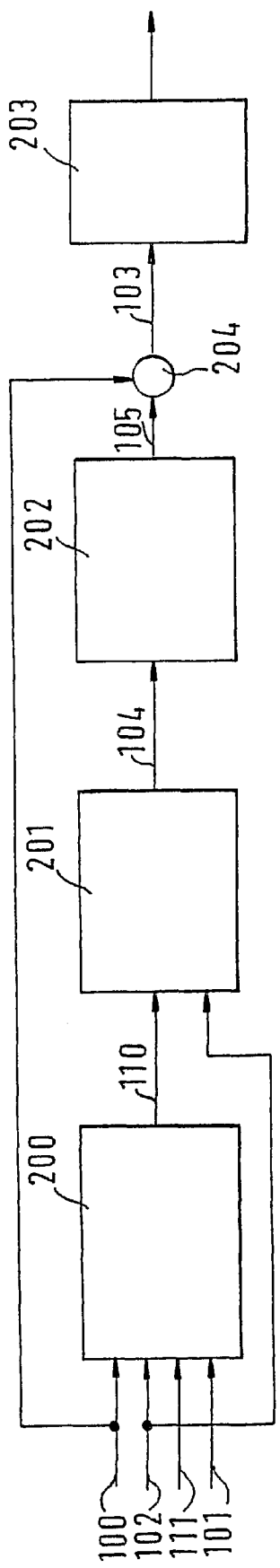
In FIG. 2, a flowchart is shown which represents a program that can be run in the microcomputer of the transmission control unit and/or the engine control unit and which shows the utilized anti-jolt controller.

A flowchart is shown in FIG. 2 which sketches a program realizing an anti-jolt controller. This program runs in a microcomputer which is part of the engine control unit 2 or the transmission control unit 4. The microcomputer detects the driver desired torque 100, the engine rpm 102, the transmission ratio 111 and the vehicle speed 101 from the sensor signals, which are prepared as required, or are derived from the sensor signals. Here, the driver command torque is formed on the basis of the signal of the sensor 20 which represents the position of the accelerator pedal while considering at least the engine rpm. In one embodiment, the vehicle speed is measured by means of a sensor and, in another embodiment, the vehicle speed is estimated on the basis of at least one selected wheel speed signal. The transmission ratio is determined as described hereinafter. The above-mentioned signals are supplied to a monitor 200 whose configuration and operation is sketched in the flowchart of FIG. 3. The output of the monitor 200 is the desired or model rpm 110. This rpm 110 is supplied to a vibration identifier 201 together with the detected engine rpm 102. The vibration identifier 201 forms the deviation between the two rpm quantities and isolates the possible rpm fluctuation in correspondence to the procedure from the state of the art mentioned initially herein. The rpm fluctuation 104, which is isolated in this way, is converted in the controller 202 into a torque change value 105, which is likewise shown in the state of the art mentioned initially herein. This torque change value is then superposed on the driver command torque 100 (see desired torque former 204), which is influenced by the change value in such a manner that the conversion of the desired torque formed in this way leads to a reduction of the drive train vibration. The desired torque 103, which is determined in this way, is then converted in block 203 into the at least one actuating quantity which is so dimensioned that the desired torque is essentially adjusted by actuating the at least one actuating member 23.

Figure 3:
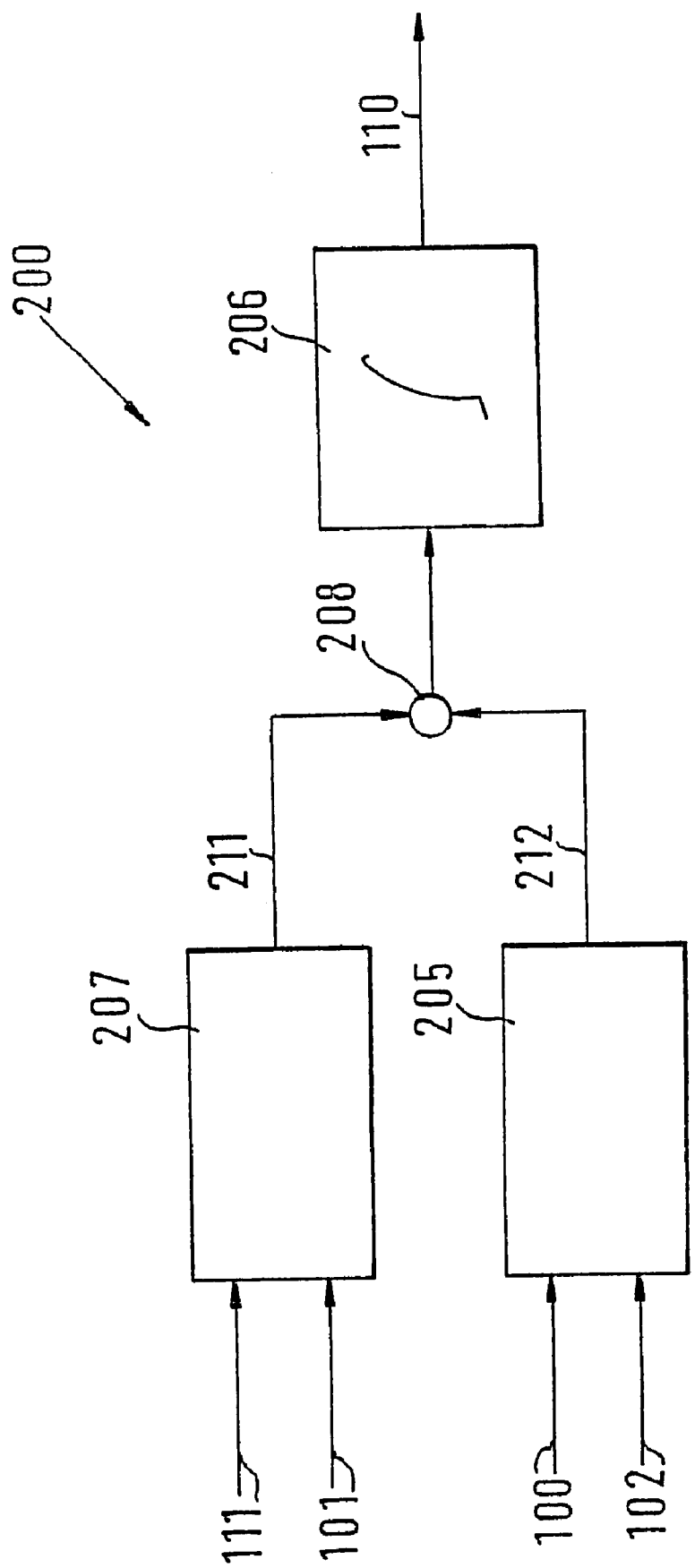
In FIG. 3, a flowchart is outlined which shows the formation of the desired or model rpm which is supplied to the anti-jolt controller.

The formation of the desired or model rpm in the monitor 200 is essential for improving the anti-jolt function. In FIG. 3, a flowchart of a preferred embodiment of this monitor is shown. If the anti-jolt controller is realized in the engine control unit and the transmission control is accommodated in another control unit, then the actual transmission ratio 111 of the transmission and/or the desired transmission ratio of the transmission is transmitted to the engine control unit 2. The actual transmission ratio 111 is determined from the signals of the rpm sensors (14, 15) in the transmission control unit or, as an alternative, in the engine control unit as follows:

JI=K*NPM/NSE

JI: actual transmission ratio

NPM: transmission output rpm

NSE: engine rpm

K: factor which considers additional transmission stages.

Especially with the presence of several clutches in the transmission, the factor K is also dependent upon the particular clutch which is switched in.

The monitor 200 contains an engine rpm gradient former 207, which computes the engine rpm gradient 211 which is caused by a transmission ratio shift of the transmission. The transmission ratio 111, which is determined as above, for example, and the vehicle speed 101 are supplied to the engine rpm gradient former 207. The engine rpm gradient is computed on the basis of these quantities in that one proceeds from a constant traveling speed before and after the transmission ratio shift and the time-dependent change of the engine rpm on the basis of the time-dependent change of the transmission ratio at constant vehicle speed and the output rpm is estimated therewith. The engine rpm gradient 211 therefore represents the gradient of the engine rpm which arises because of the shift of the transmission. A further engine rpm gradient 212 is computed in the engine rpm gradient former 205, for example, on the basis of the driver command torque 100 and the engine rpm 102. The engine rpm gradient 212 represents the engine rpm gradient which arises from the command of the driver after acceleration of the vehicle. In other embodiments, in lieu of the driver command torque 100, another quantity is applied, which represents the driver command torque. The other quantity is, for example, the acceleration torque used in the state of the art, the actual torque, the accelerator pedal position, et cetera. For determining the engine rpm gradient 212, one proceeds from the situation that the driver command torque corresponds to a specific acceleration of the vehicle under the current conditions without considering the shift of the transmission ratio (already considered when detecting the acceleration torque). Then, a conclusion is drawn as to an rpm change from the increase of the speed to be expected for an unchanged transmission ratio.

The two engine rpm gradients are coupled and preferably added (logic position 208) and the result (sum) is integrated in the integrator 206. The result is the desired or model rpm 110 for the anti-jolt controller.

The parameters, which are necessary for computing the engine rpm gradient in the computation blocks 205, 206 and 207, are read out from characteristic lines as a function of the transmission ratio 111.

The illustrated procedure is utilized also for transmissions which have a continuous shift characteristic.

What is claimed is:

1. A method for controlling a drive unit of a vehicle having a drive train operatively connected to said drive unit, the drive unit generating a torque during operation of the vehicle, the method comprising the steps of:

influencing the torque of the drive unit in the sense of a reduction of vibrations in train in the vehicle and deriving the influencing of the torque from a comparison of the rpm of the drive unit with a pregiven desired rpm; and, determining the desired rpm in dependence upon the engine rpm gradients caused by the driver input and/or the transmission ratio shift of the transmission.

2. The method of claim 1, wherein the transmission is a transmission having a continuous shift characteristic, especially a CVT transmission.

3. The method of claim 1, wherein the engine rpm gradient, which is caused by the transmission ratio shift, is determined on the basis of the transmission ratio and the vehicle speed.

4. The method of claim 1, wherein the engine rpm gradient, which corresponds to the driver command, is determined from the driver input and the engine rpm.

5. The method of claim 1, wherein the determined gradients are logically coupled and the coupling result is integrated to the desired engine rpm.

6. An arrangement for controlling a drive unit of a vehicle having a drive train operatively connected to said drive unit, the arrangement comprising:

a control unit for influencing a torque of the drive unit in the sense of reducing the vibrations in the drive train of the vehicle;

a controller unit for influencing the torque on the basis of the actual rpm and a desired rpm in the sense of a reduction of vibrations;

said controller unit including a monitor for determining the engine rpm gradient, which is caused by a transmission ratio shift, and/or the engine rpm gradient, which is caused by the driver input; and, said controller unit including means for deriving the desired torque rpm from at least one of said gradients.

\* \* \* \* \*

UNITED STATES PATENT AND TRADEMARK OFFICE
CERTIFICATE OF CORRECTION

PATENT NO.      : 6,631,319 B1
DATED           : October 7, 2003
INVENTOR(S)     : Joachim Luh It is certified that error appears in the above-identified patent and that said Letters Patent is hereby corrected as shown below:

Column 4,
Line 32, -- the drive -- should be inserted between "in" and "train".

Signed and Sealed this

Second Day of March, 2004

JON W. DUDAS
*Acting Director of the United States Patent and Trademark Office*